(12) United States Patent
Berry, Jr.

(10) Patent No.: US 11,087,360 B2
(45) Date of Patent: Aug. 10, 2021

(54) SECURELY BRIDGING ADVERTISING IDENTIFIERS FOR TARGETED ADVERTISING

(71) Applicant: AT&T INTELLECTUAL PROPERTY I, LP, Atlanta, GA (US)

(72) Inventor: Michael J. Berry, Jr., Mansfield, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 873 days.

(21) Appl. No.: 15/172,580

(22) Filed: Jun. 3, 2016

(65) Prior Publication Data

US 2017/0352059 A1  Dec. 7, 2017

(51) Int. Cl.
| | |
|---|---|
| *G06Q 30/02* | (2012.01) |
| *H04L 29/08* | (2006.01) |
| *H04W 12/08* | (2021.01) |
| *H04W 4/23* | (2018.01) |
| *H04W 4/12* | (2009.01) |
| *G06F 16/00* | (2019.01) |

(Continued)

(52) U.S. Cl.
CPC ......... *G06Q 30/0267* (2013.01); *G06F 16/00* (2019.01); *G06Q 30/0261* (2013.01); *G06Q 30/0277* (2013.01); *H04L 67/02* (2013.01); *H04L 67/28* (2013.01); *H04W 4/12* (2013.01); *H04W 4/23* (2018.02); *H04W 12/08* (2013.01); *H04L 61/157* (2013.01); *H04L 63/101* (2013.01); *H04L 63/107* (2013.01); *H04W 12/63* (2021.01); *H04W 12/72* (2021.01)

(58) Field of Classification Search
CPC ........... G06Q 30/0267; G06Q 30/0277; G06Q 30/0261; G06F 16/00; H04W 12/08; H04W 4/23; H04W 4/12; H04L 67/28; H04L 67/02; H04L 63/107; H04L 63/101; H04L 61/157
USPC ....................................... 707/696; 705/14.64
See application file for complete search history.

(56) References Cited

U.S. PATENT DOCUMENTS

| | | |
|---|---|---|
| 5,933,811 A | 8/1999 | Blattner et al. |
| 6,119,098 A | 9/2000 | Gautier et al. |

(Continued)

FOREIGN PATENT DOCUMENTS

| | | |
|---|---|---|
| KR | 20090094947 | 9/2009 |
| WO | 0077978 A2 | 12/2000 |
| WO | 2015041578 A1 | 3/2015 |

OTHER PUBLICATIONS

"Safeguarding Web Surfing with URL Blacklisting" Authors: Tara Baniya and Yoohwan Kim (Year: 2015).*

(Continued)

*Primary Examiner* — Victoria E Frunzi
(74) *Attorney, Agent, or Firm* — Guntin & Gust, PLC; Kenneth Kwan

(57) ABSTRACT

Aspects of the subject disclosure may include, for example, a mobile device gateway that receives an HTTP POST message including an advertising identifier from a mobile device, determining whether a uniform resource locator of the HTTP POST message is on a list of URLs for data management platforms; and routing the HTTP POST message to the Internet responsive to determining that the URL of the HTTP POST message is not on the list of URLs for data management platforms. Other embodiments are disclosed.

20 Claims, 7 Drawing Sheets

(51) Int. Cl.
*H04L 29/06* (2006.01)
*H04L 29/12* (2006.01)
*H04W 12/63* (2021.01)
*H04W 12/72* (2021.01)

(56) References Cited

U.S. PATENT DOCUMENTS

| | | |
|---|---|---|
| 8,279,848 B1 | 10/2012 | Gailloux et al. |
| 8,391,846 B1 | 3/2013 | Mankovitz et al. |
| 8,442,858 B1 | 5/2013 | Barnes et al. |
| 8,566,158 B2 | 10/2013 | Cansler et al. |
| 8,930,701 B2 * | 1/2015 | Burbank ............ G06F 21/6245 713/171 |
| 9,201,979 B2 | 12/2015 | Ramer |
| 9,251,520 B2 | 2/2016 | Shen |
| 9,934,409 B2 * | 4/2018 | Cuthbertson ....... G06F 21/6254 |
| 2004/0193488 A1 | 9/2004 | Khoo et al. |
| 2007/0105536 A1 | 5/2007 | Tingo et al. |
| 2008/0086360 A1 | 4/2008 | Kanapur et al. |
| 2008/0153520 A1 | 6/2008 | Kirtane et al. |
| 2009/0006187 A1 | 1/2009 | Marcuvitz et al. |
| 2009/0011744 A1 | 1/2009 | Daley et al. |
| 2009/0077579 A1 | 3/2009 | Li et al. |
| 2009/0089131 A1 * | 4/2009 | Moukas ............ G06Q 10/0631 705/70 |
| 2009/0281872 A1 | 11/2009 | Kalaboukis et al. |
| 2009/0298480 A1 | 12/2009 | Khambete et al. |
| 2012/0166520 A1 * | 6/2012 | Lindsay ................ G06F 3/0488 709/203 |
| 2013/0226863 A1 * | 8/2013 | Jonker .................... H04L 41/00 707/609 |
| 2015/0039394 A1 | 2/2015 | Bonito |
| 2015/0324847 A1 * | 11/2015 | Bonzi ................ G06Q 30/0247 705/14.54 |
| 2016/0132938 A1 * | 5/2016 | Wiener .............. G06Q 30/0269 705/14.66 |
| 2016/0315905 A1 * | 10/2016 | Gupta .................... H04L 69/14 |
| 2016/0358209 A1 * | 12/2016 | Shiravi Khozani ......................... G06Q 30/0255 |

OTHER PUBLICATIONS

"AT&T Adworks Blueprintsm Provides Innovative Ways of Targeting Audiences on TV, Mobile and online", FierceCable, fiercecable.com, May 20, 2013.

Bergen, Mark et al., "Verizon Looks to Target Its Mobile Subscribers With Ads", AdvertisingAge, adage.com, May 21, 2014.

Kaye, Kate, "Oracle and Adobe Invest in Cross-Device Identification Trend", AdvertisingAge, adage.com, May 23, 2016.

Patel, Kunur, "Carriers, Ad Associations Wrestle With Mobile Ad Targeting", AdvertisingAge, adage.com, Mar. 7, 2011.

Southern, Matt, "New Facebook Ad Targeting Lets You Target Users by Device", Search Engine® Journal, searchenginejournal.com, Jul. 23, 2014.

* cited by examiner

200

SECURELY BRIDGING ADVERTISING IDENTIFIERS FOR TARGETED ADVERTISING

FIELD OF THE DISCLOSURE

The subject disclosure relates to a system and method for securely bridging advertising identifiers with mobile subscriber identification for targeted advertising.

BACKGROUND

Whenever a mobile device sends a request for an advertisement, additional information is typically included with the request that identifies the mobile device making the request. Because mobile devices do not use cookies, mobile device manufacturers include an identifier for the mobile device with this request, known as an advertising identifier, for tracking advertising "impression" data, which is data that indicates that the advertisement has been viewed, and so that activity of the mobile device can be monitored. Based on historical activity of the mobile device, demographic data of the user may be inferred. The mobile device manufacturers sell targeted advertising based on the inferred demographic data, which can be imprecise. For example, more than one person may use a mobile device, thereby affecting the activity monitored.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for associating a trusted identifier for a subscriber with an advertising identifier for a mobile device. Other embodiments are described in the subject disclosure.

One or more aspects of the subject disclosure include a mobile device gateway that receives a communications message from a mobile device that includes a commonly used advertising identifier. The mobile device gateway determines whether the message is being sent to a data management platform in the system by checking a destination uniform resource locator in the message. If the message is not being sent to a system data management platform, the mobile device gateway routes the message to the Internet unchanged. But if the message is being sent to a system data management platform, the mobile device gateway puts an encrypted identifier for the subscriber in the message before sending it to the data management platform via the Internet, without jeopardizing the anonymity of the subscriber.

One or more aspects of the subject disclosure further include a data management platform in the system that receives the message and can extract the advertising identifier and the encrypted identifier for the subscriber. With these identifiers, the data management platform can create an association between the advertising identifier and the subscriber, and create a record in a bridge file of the association.

One or more aspects of the subject disclosure further include creating a targeted advertising campaign based on criteria about a subscriber known only to the carrier. The data management platform can search subscriber data and assemble a list of subscribers meeting the criteria. The data management platform can use the bridge file to substitute the advertising identifier for the subscriber's identity in the list, so that the list can be supplied to third parties, thereby maintaining the anonymity of the subscriber's name.

Figure 1:
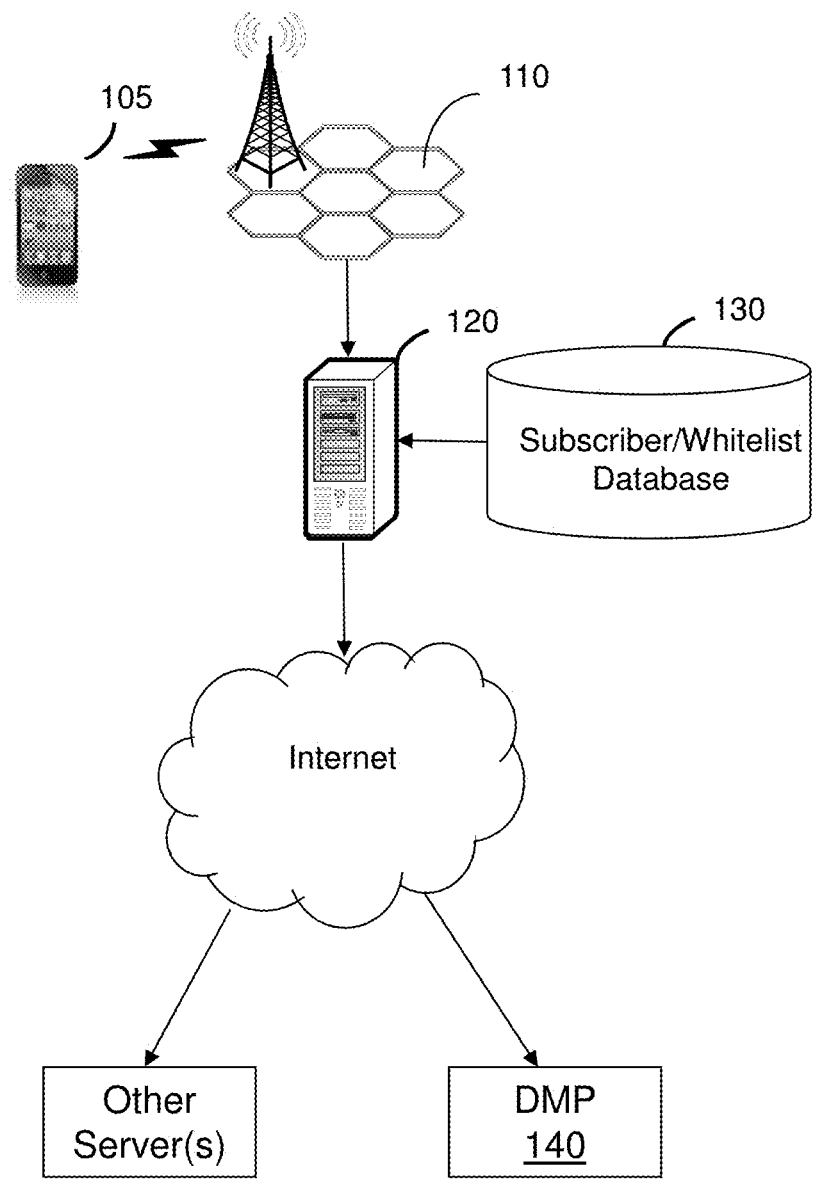
FIG. 1 depicts an illustrative embodiment of a system for securely bridging mobile device advertising identifiers with trusted identifiers for subscribers for targeted advertising.

FIG. 1 depicts an illustrative embodiment of a system for securely bridging mobile device advertising identifiers with trusted identifiers for subscribers for targeted advertising. As shown in FIG. 1, system 100 comprises a mobile communication network 110, a mobile device gateway 120, a subscriber/whitelist database 130, and a data management platform 140. Mobile device 105 is connected to the Internet for data services through the mobile communication network 110 and the mobile device gateway 120. As with many mobile carriers, the mobile device gateway 120 acts as an Internet gateway for the mobile devices 105 by forwarding data packets destined for hosts on the Internet, and routes data packets from the Internet back to the mobile devices, as is typical of any gateway between two networks. The mobile device gateway 120 receives Internet data traffic from mobile device 105 over mobile communication network 110 and routes the data to the destination over the Internet. Likewise, Internet data destined for the mobile device 105 is routed through the Internet to the mobile device gateway 120, which sends the data through the mobile communication network 110 to the mobile device 105.

In particular, whenever the mobile device 105 loads and views an advertisement, for example, as part of a Web page, a technique known in the art as a "pixel script" launches on the mobile device 105. The pixel script is typically a small script written in JavaScript that is embedded in the advertisement, hidden behind a pixel. The script provides an indication (known in the art as an advertising "impression" data) that the mobile device has loaded the advertisement and rendered the advertisement on a display screen of the mobile device 105. The pixel script causes the mobile device 105 to include a data payload in an HTTP POST method message to a uniform resource locator (URL) specified by the script.

When the HTTP POST method message passes through the mobile device gateway 120, the mobile device gateway 120 examines the payload. The payload typically contains information identifying the advertisement, the date/time of loading, and possibly additional data concerning the length of time the advertisement was viewed, etc. Included with the payload is a commonly available advertising identifier (ADID) associated with the mobile device, which maintains the anonymity of the mobile device user, typically supplied by the mobile device manufacturer.

In an embodiment of the system, the mobile device gateway 120 examines the URL found in an HTTP POST message payload to determine whether the destination is a data management platform (DMP) 140 that is listed in the subscriber/whitelist database 130.

If the destination URL in the payload is not for the DMP 140 listed in the subscriber/whitelist database 130, then the mobile device gateway 120 forwards the HTTP POST message unaltered. If the destination URL in the payload is for DMP 140, then the mobile device gateway 120 obtains a proprietary, encrypted trusted identifier (TID) for the subscriber in real time, and inserts the TID into the payload. By providing information that cannot be used to identify the subscriber, a third party examining the encrypted trusted identifier will not be able to determine the identity of the subscriber, thereby preventing identifying information for the subscriber from being released into the Internet. Next, the mobile device gateway 120 forwards the HTTP POST message through the Internet to the DMP 140.

Upon receipt of the payload, the DMP 140 may then extract the TID, which can now be cross-referenced to the ADID and placed into a subscriber bridge file. Given the subscriber bridge file, and information concerning the subscriber, accurate, targeted advertisement campaigns may be performed based on demographic data, e.g., subscriber data known only to the mobile carrier keyed on TID. The DMP 140 may combine the demographic data of the subscriber with advertising demographic data provided by a prospective advertiser keyed on the ADID, or third party supplied demographic data keyed to the ADID. Payload data received by the DMP 140 can be stripped of the TID and provided to the advertiser, thereby maintaining anonymity of the subscriber.

Figure 2:
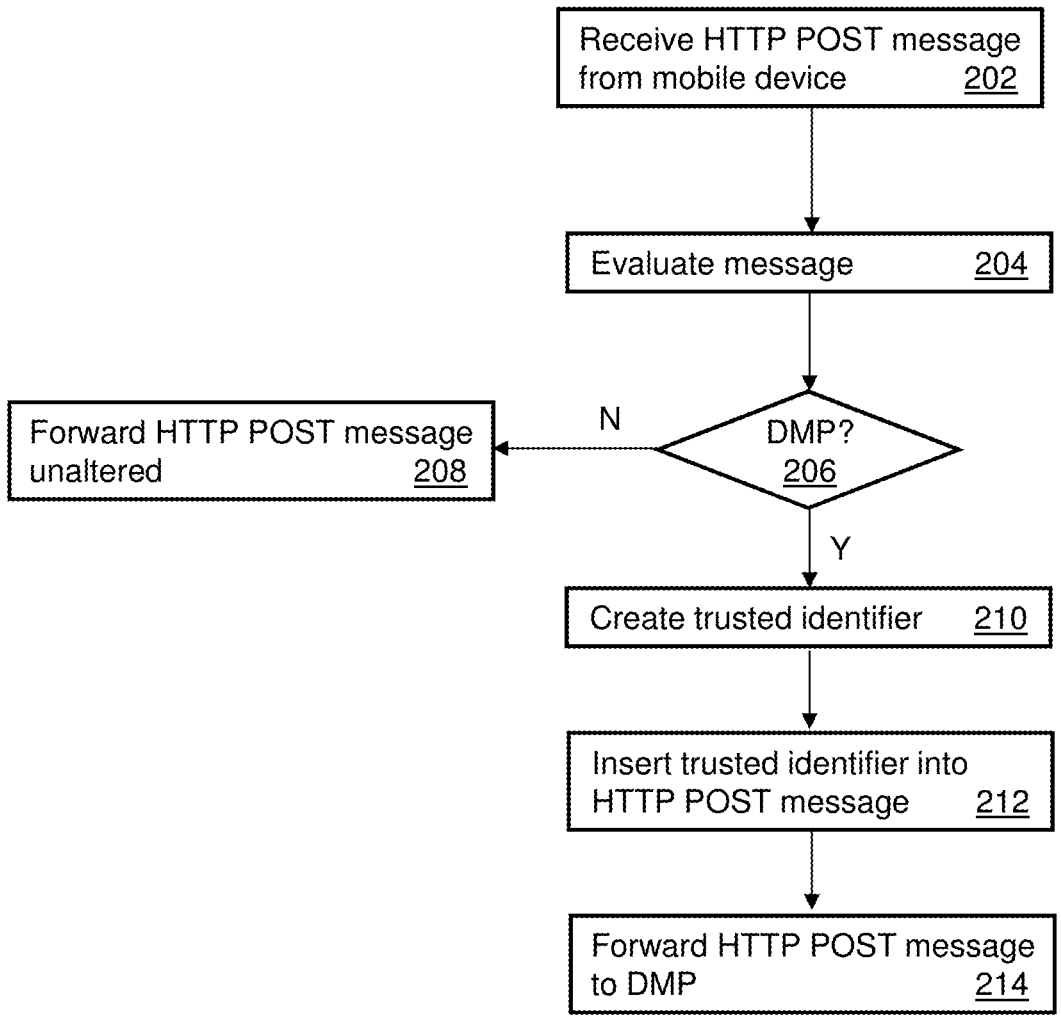
FIG. 2 depicts an illustrative embodiment of a method performed by the mobile device gateway.

FIG. 2 depicts an illustrative embodiment of a method performed by the mobile device gateway 120. As shown in FIG. 2, in step 202, the mobile device gateway 120 receives an HTTP POST message over the mobile communication network 110 from the mobile device 105 executing a pixel script embedded in an advertisement. The HTTP POST message can include a device identifier, such as an identifier for advertisers (IDFA) for an Apple device, or an Android Advertising Identifier for an Android device (AAID) (collectively, the ADID), a data management platform identifier, a destination URL and advertising impression data, where the advertising impression data may indicate that the mobile device 105 has loaded and rendered the advertisement on a display of the mobile device 105.

Next, in step 204, the mobile device gateway 120 begins a process to evaluate whether the URL destination is to a data management platform. In particular, the mobile device gateway 120 extracts the destination URL from the payload of the HTTP POST message.

Next, in step 206, the mobile device gateway 120 queries the subscriber/whitelist database 130 to see if the destination URL extracted from the HTTP POST message matches a data management platform listed in the subscriber/whitelist database 130. If the destination URL matches a URL for a data management platform listed in the subscriber/whitelist database 130, then the method continues to step 210, described below. If the destination URL is not found as a result of the query of the subscriber/whitelist database 130, then the HTTP POST message is forwarded through the Internet unaltered.

In step 210, the mobile device gateway 120 queries the subscriber/whitelist database 130 for the subscriber identifier. The mobile device gateway 120 then appends additional information to the subscriber identifier and encrypts the combination, thereby creating a TID for the subscriber, where the identity of the subscriber cannot be determined by any third party observer of the TID in the HTTP POST message as the message passes through the Internet.

Next, in step 212, the mobile device gateway 120 inserts the TID into the payload of the HTTP POST message.

Finally, in step 214, the mobile device gateway 120 forwards the HTTP POST message through the Internet to the data management platform for further processing.

Figure 3:
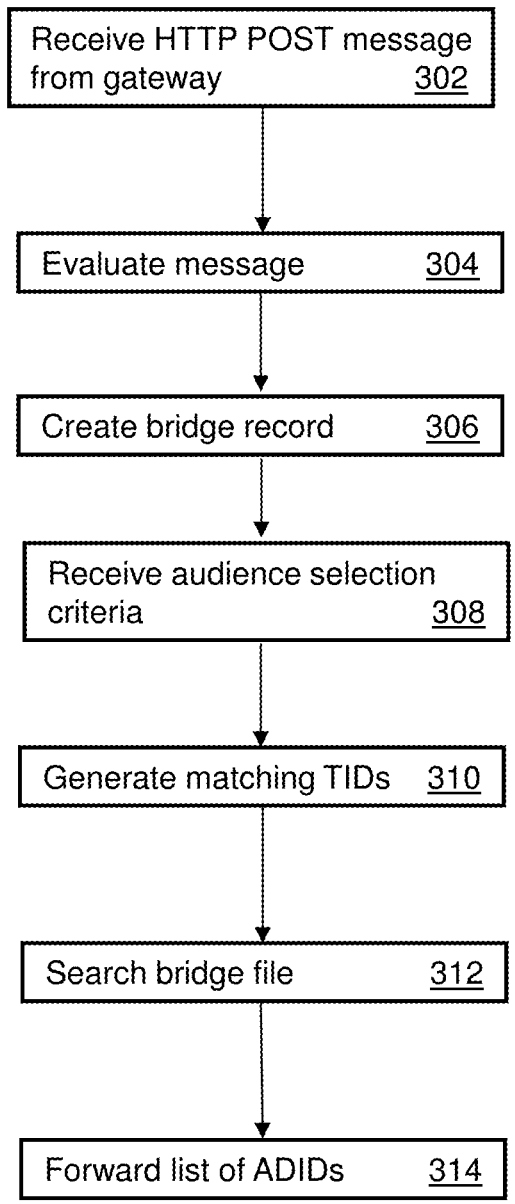
FIG. 3 depicts an illustrative embodiment of a method performed by the data management platform.

FIG. 3 depicts an illustrative embodiment of a method performed by the data management platform 140. As shown in FIG. 3, in step 302, data management platform 140 receives the HTTP POST message over the Internet from the mobile device gateway 120.

In step 304, the data management platform 140 evaluates the HTTP POST message by extracting the ADID, the data management platform ID, and the TID.

Next, in step 306, the data management platform 140 creates a database record that associates the TID with the ADID, and optionally with the data management platform ID in a bridge file. The bridge file can be used to create an audience selection profile for targeted advertisements, based on the particular subscriber demographic data known to the carrier.

In step 308, the data management platform starts the process of creating an audience selection profile by receiving audience selection criteria from a requestor. The criteria can be any precisely known information about the subscriber by the carrier, including but not limited to subscriber demographic data, such as age, gender, ethnicity, subscriber location, such as home address, work address, or other address, television viewing habits, such as genre, program, or channel, or Web browsing URL data, such as shopping portals (eBay, Craigslist, etc.), direct marketers, etc. The criteria may also include criteria inferred by traditional Internet market tracking data, based on the ADID.

Next in step 310, the data management platform creates an audience selection profile by searching carrier proprietary subscriber information for subscribers that matches the audience selection criteria. The then generates a list of TIDs for matching subscribers.

Next in step 312, the data management platform searches the bridge file to replace each TID in the list with the associated ADID.

Finally, in step 314, the data management platform supplies the list of ADIDs that match the audience selection criteria as the audience selection profile to the requestor. The requestor may use the list to select and send targeted advertisements to the mobile devices on the list when advertisements are requested by the mobile device.

While for purposes of simplicity of explanation, the respective processes are shown and described as a series of blocks in FIGS. 2 and 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
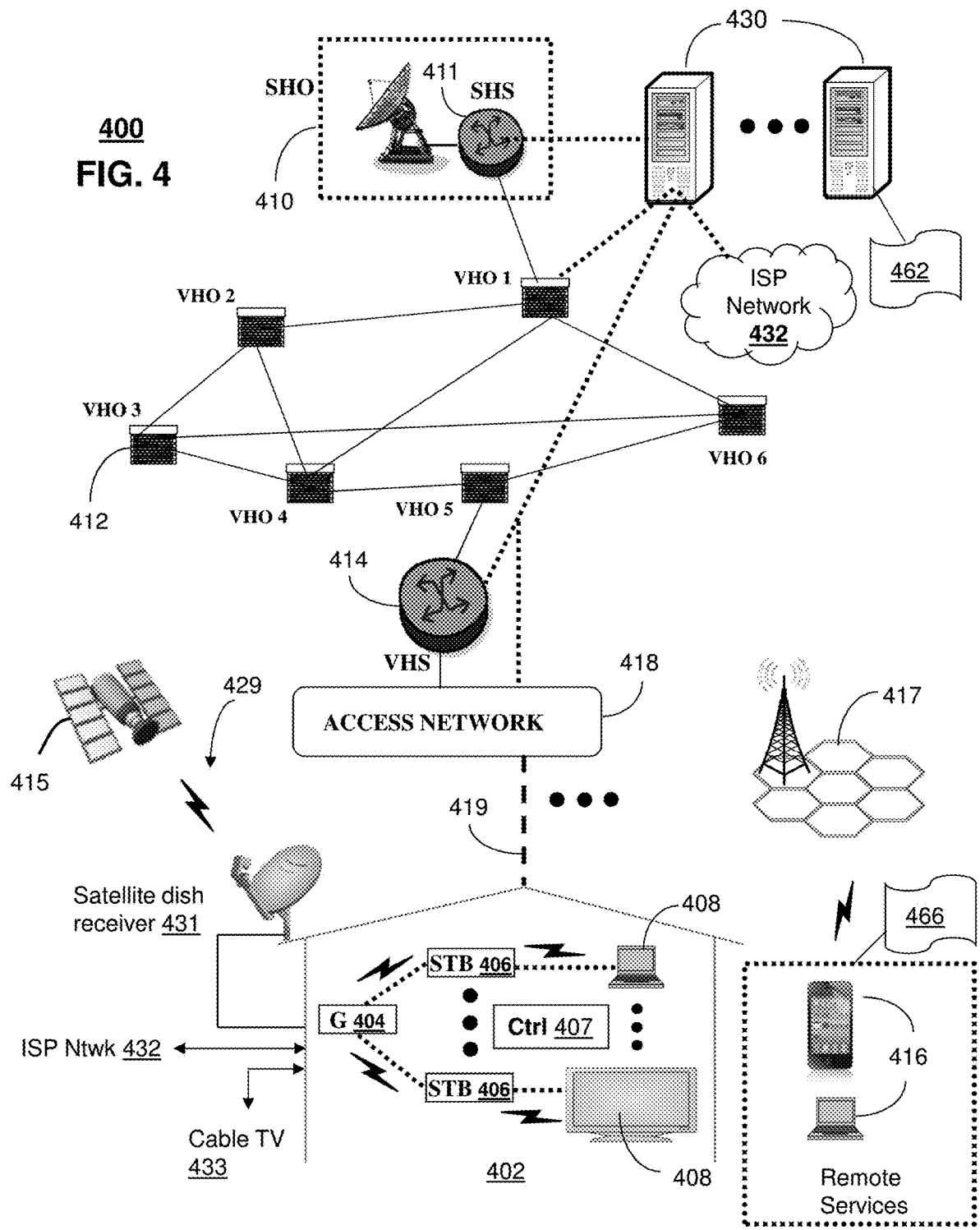
FIGS. 4-5 depict illustrative embodiments of communication systems that provide media services to mobile devices that consume advertising.

FIG. 4 depicts an illustrative embodiment of a first communication system 400 for delivering media content. The communication system 400 can represent an Internet Protocol Television (IPTV) media system. Communication system 400 can be overlaid or operably coupled with the mobile communications network illustrated in FIG. 1 as another representative embodiment of communication system 400. For instance, one or more devices illustrated in the communication system 400 of FIG. 4 may be representative of components in the system 100 illustrated in FIG. 1. For example, the mobile communication network 110 may be represented by the mobile cellular network 417 and the functions of the mobile device gateway 120 and/or the data management platform 140 may be performed by the computing devices 430 described below.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416 through mobile cellular network 417.

Communication system 400 can also provide for all or a portion of the computing devices 430 to function as a mobile device gateway (herein referred to as gateway 430). The gateway 430 can use computing and communication technology to perform function 462, which can include among other things, the advertising identifier bridging techniques described by methods of FIGS. 1 and 2. For instance, function 462 of gateway 430 can be similar to the functions described for the mobile device gateway 120 illustrated in FIG. 1 in accordance with the method described in FIG. 2. Additionally, the function 462 of gateway 430 can include the functions described for the data management platform 140 illustrated in FIG. 1 in accordance with the method described in FIG. 3. The wireless communication devices 416 can be provisioned with web browsing software functions 466 to utilize the services of gateway 430. For instance, functions 466 of wireless communication devices 416 can be similar to the functions described for the mobile device 105 of FIG. 1 in accordance with method described in FIG. 2.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
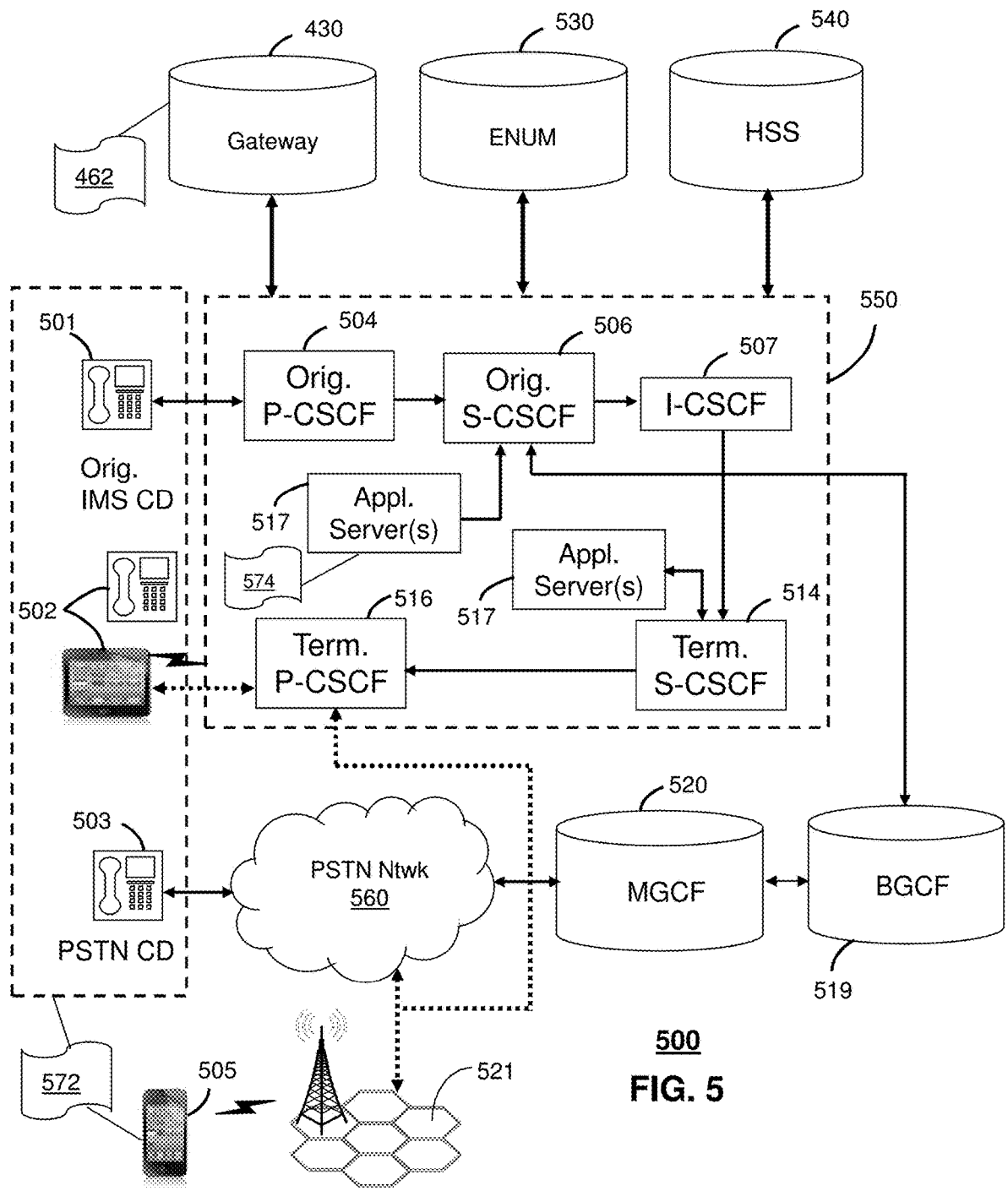

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400 to implement a system for securely bridging mobile device advertising identifiers with trusted identifiers for subscribers for targeted advertising.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The gateway 430 of FIG. 4 can be operably coupled to communication system 500 for purposes similar to those described above. Gateway 430 can perform function 462 and thereby provide securely bridging advertising identifiers with mobile subscriber identification for targeted advertising services to the CDs 501, 502, 503 and 505 of FIG. 5 similar to the functions described for mobile device gateway 120 of FIG. 1 in accordance with method 200 of FIG. 2 or data management platform 140 of FIG. 1 in accordance with method 300 of FIG. 3. CDs 501, 502, 503 and 505, which can be adapted with software to perform function 572 to utilize the services of the gateway 430 similar to the functions described for mobile devices 105 of FIG. 1. Gateway 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
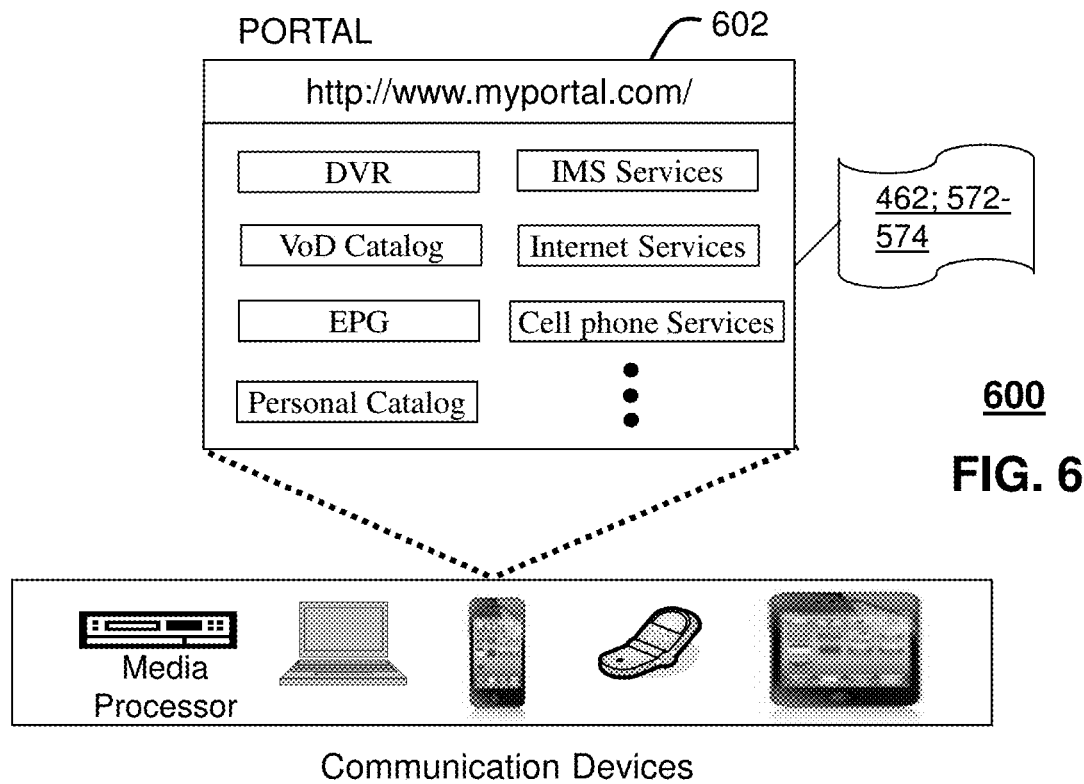
FIG. 6 depicts an illustrative embodiment of a web portal for interacting with the communication systems of mobile devices.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100 of FIG. 1, communication system 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications that provide functions 462, and 572-574, to adapt these applications as may be desired by subscribers and/or service providers of system 100 of FIG. 1, and communication systems 400-500. For instance, users of the services provided by mobile device gateway 120, data management platform 140 or gateway 430 can log into their on-line accounts and provision the data management platform 140 or gateway 430 with subscriber demographic information concerning their subscription, or to opt-in for targeted advertising, and so on. Service providers can log onto an administrator account to provision, monitor and/or maintain the system 100 of FIG. 1 or gateway 430.

Figure 7:
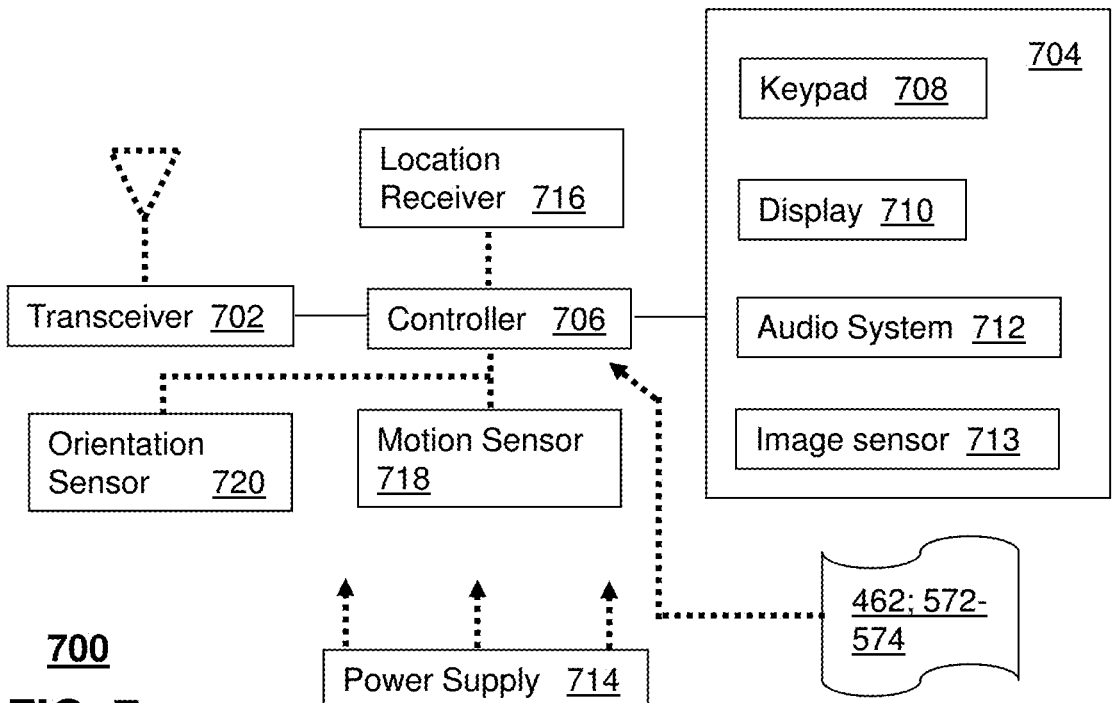
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 1 and FIGS. 4-5 and can be configured to perform portions of method 200 of FIG. 2.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a keypad 708, such as a depressible or touch-sensitive keypad with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of mobile device 105, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in system 100 of FIG. 1, communication systems 400-500 of FIGS. 4-5 such as a gaming console and a media player. In addition, the controller 706 can be adapted in various embodiments to perform the functions 462 and 572-574, respectively.

Upon reviewing the aforementioned embodiments, it would be evident to an artisan with ordinary skill in the art that said embodiments can be modified, reduced, or enhanced without departing from the scope of the claims described below. For example, some or all of the functions of the data management platform 140 can be performed by the mobile device gateway 120. In one embodiment, the mobile device gateway 120 can create a record in the bridge file associating the subscriber identifier with the ADID without altering the HTTP POST message, or even generating a TID. Naturally, a secure means of transmitting the bridge file information from the mobile device gateway 120 to a device creating the audience selection profile would still be needed. In another embodiment, the mobile device gateway 120 may create the list of ADIDs that match the audience selection criteria to generate an audience selection profile.

In another embodiment, the subscriber/whitelist database 120 may include the URL of a third party advertising publisher or an advertising selection system. The mobile device gateway 120 can insert the TID into the payload of an HTTP GET message for an advertisement that include the ADID. Such HTTP GET message would be generated by the mobile device 105 when loading a web page containing an advertisement. The HTTP GET message would be sent to that third party advertising publisher or selection system, which can send a copy of the HTTP GET message back to the data management platform 140. Alternatively, the third party advertising publisher or selection system can extract the TID and ADID from the HTTP GET message, create the bridge file record and send the record associating the TID and ADID back to the data management platform 140 via a system to system exchange of data. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
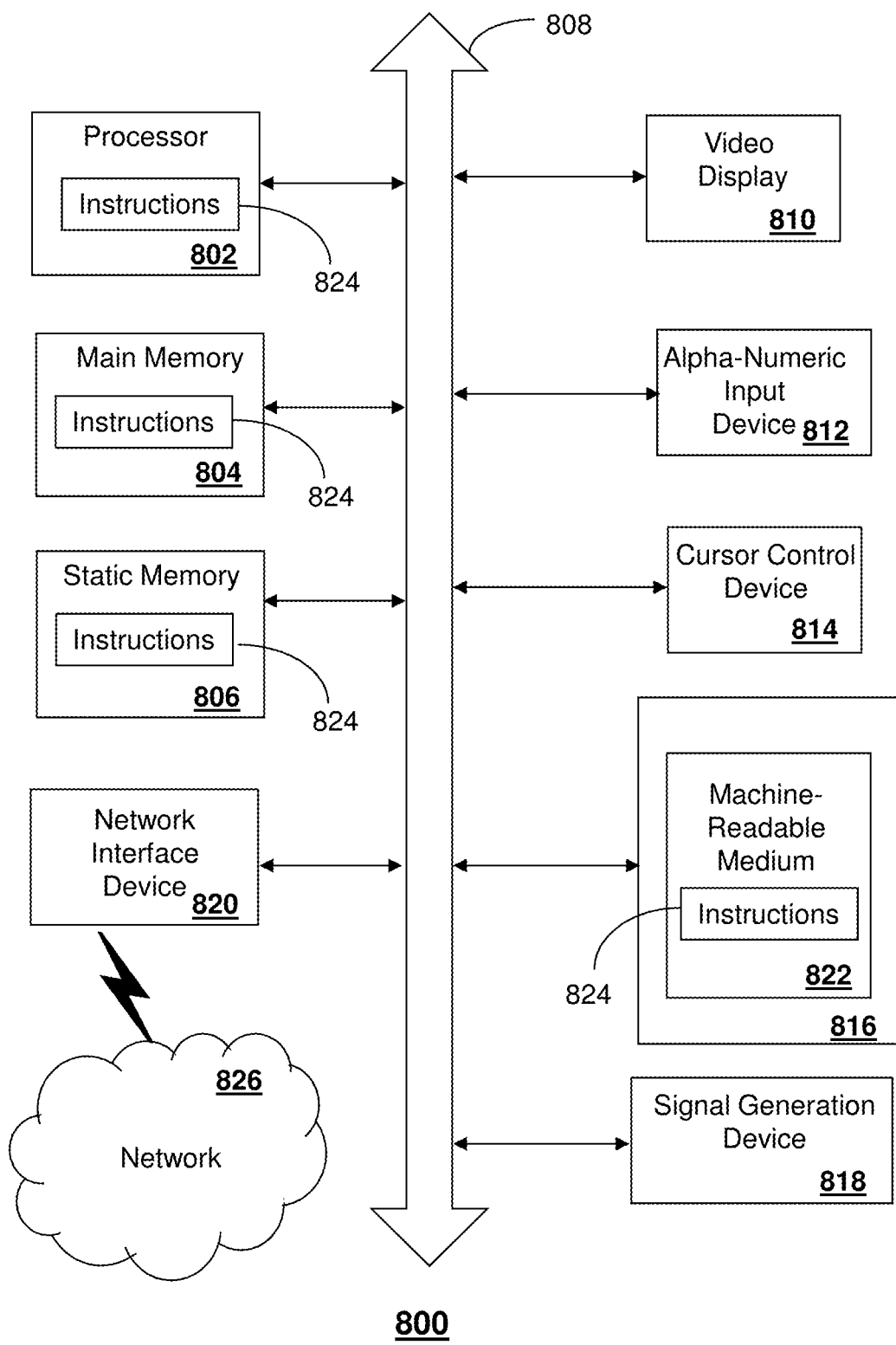
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the gateway 430, the media processor 406, a mobile device 105, the mobile device gateway 120, the data management platform 140 and other devices of FIG. 1. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A gateway, comprising:
a processing system including a processor; and
a memory that stores executable instructions that, when executed by the processing system, facilitate performance of operations, comprising:
decoding signals received from a mobile device to obtain one or more packets, wherein the one or more packets comprise an HTTP POST message from the mobile device, wherein the HTTP POST message comprises an advertising identifier that is unique to the mobile device, wherein the advertising identifier is provided by a supplier of the mobile device and provides anonymity of a subscriber associated with the mobile device, wherein the HTTP POST message is generated from a pixel script embedded in an advertisement, wherein the pixel script is hidden behind a pixel of the advertisement, and wherein the pixel script is executed by the mobile device;
extracting a uniform resource locator (URL) of the HTTP POST message from a payload of the HTTP POST message;
determining whether the URL of the HTTP POST message is on a list of URLs used for accessing data management platforms;
responsive to a determination that the URL of the HTTP POST message is not on the list of URLs used for accessing the data management platforms, routing the HTTP POST message to an Internet; and
responsive to a determination that the URL of the HTTP POST message is on the list of URLs used for accessing the data management platforms:
encrypting a trusted identifier, resulting in an encrypted trusted identifier that is cross-referenced to the advertising identifier, wherein subscriber data relating to the subscriber associated with the mobile device is keyed on the encrypted trusted identifier;
inserting the encrypted trusted identifier into the HTTP POST message, resulting in a modified HTTP POST message; and
routing the modified HTTP POST message to the Internet,
wherein the encrypted trusted identifier is to be associated, by a particular data management platform corresponding to the URL, in a database record with the advertising identifier, wherein associating of the encrypted trusted identifier with the advertising identifier in the database record permits the particular data management platform to transmit the advertising identifier to a third-party requestor based on matching the advertising identifier to audience selection criteria submitted by the third-party requestor to the particular data management platform, wherein receipt of the advertising identifier by the third-party requestor from the particular data management platform enables the third-party requestor to provide targeted advertisements to the mobile device using the advertising identifier, and wherein the routing the HTTP POST message to the Internet, responsive to the determination that the URL of the HTTP POST message is not on the list of URLs used for accessing the data management platforms, includes routing the HTTP POST message without inserting the encrypted trusted identifier into the HTTP POST message.

2. The gateway of claim 1, wherein the operations further comprise receiving provisioning of demographic information relating to the subscriber, a user instruction to opt-in or opt-out of targeted advertising, or a combination thereof.

3. The gateway of claim 1, wherein the operations further comprise creating the trusted identifier from a subscriber identifier.

4. The gateway of claim 3, wherein the database record comprises a bridge file.

5. The gateway of claim 1, wherein the particular data management platform receives the modified HTTP POST message and creates the database record associating the trusted identifier with the advertising identifier responsive to receiving the modified HTTP POST message.

6. A method, comprising:
decoding, by a system comprising a processor, signals received from a mobile device, to obtain one or more packets, wherein the one or more packets comprise an HTTP POST message from the mobile device, wherein the HTTP POST message comprises an advertising identifier that is unique to the mobile device, wherein the advertising identifier is provided by a supplier of the mobile device and provides anonymity of a subscriber associated with the mobile device, wherein the HTTP POST message is generated from a pixel script embedded in an advertisement, wherein the pixel script is hidden behind a pixel of the advertisement, and wherein the pixel script is executed by the mobile device;

extracting, by the system, a uniform resource locator (URL) of the HTTP POST message from a payload of the HTTP POST message;

determining, by the system, whether the URL of the HTTP POST message is on a list of URLs used for accessing data management platforms of the system;

responsive to a determination that the URL of the HTTP POST message is not on the list of URLs used for accessing the data management platforms, routing the HTTP POST message to an Internet; and responsive to a determination that the URL of the HTTP POST message is on the list of URLs used for accessing the data management platforms of the system:

encrypting, by the system, a trusted identifier, resulting in an encrypted trusted identifier that is cross-referenced to the advertising identifier, wherein subscriber data relating to the subscriber associated with the mobile device is keyed on the encrypted trusted identifier;

inserting, by the system, the encrypted trusted identifier into the HTTP POST message, resulting in a modified HTTP POST message; and routing the modified HTTP POST message to the Internet, wherein the encrypted trusted identifier is to be associated, by a particular data management platform corresponding to the URL, in a database record with the advertising identifier, wherein associating of the encrypted trusted identifier with the advertising identifier in the database record permits the particular data management platform to transmit the advertising identifier to a third-party requestor based on matching the advertising identifier to audience selection criteria submitted by the third-party requestor to the particular data management platform, wherein receipt of the advertising identifier by the third-party requestor from the particular data management platform enables the third-party requestor to provide targeted advertisements to the mobile device using the advertising identifier, and wherein the routing the HTTP POST message to the Internet, responsive to the determination that the URL of the HTTP POST message is not on the list of URLs used for accessing the data management platforms of the system, includes routing the HTTP POST message without inserting the encrypted trusted identifier into the HTTP POST message.

7. The method of claim 6, further comprising receiving provisioning of demographic information relating to the subscriber, a user instruction to opt-in or opt-out of targeted advertising, or a combination thereof.

8. The method of claim 6, wherein the HTTP POST message further comprises advertising impression data.

9. The method of claim 6, wherein the associating of the encrypted trusted identifier with the advertising identifier in the database record permits the particular data management platform to build an audience selection profile based on searching carrier proprietary subscriber information for a particular subscriber that matches the audience selection criteria, identify, in the database record and based on the audience selection profile, the encrypted trusted identifier relating to the subscriber, and provide, to the third-party requestor responsive to identifying the encrypted trusted identifier relating to the subscriber, the advertising identifier that is associated with the encrypted trusted identifier in the database record.

10. The method of claim 9, wherein the audience selection profile is based on subscriber demographic data.

11. The method of claim 10, wherein the subscriber demographic data includes age, gender, ethnicity, or a combination thereof.

12. The method of claim 9, wherein the audience selection profile is based on subscriber television viewing habits.

13. The method of claim 12, wherein the subscriber television viewing habits include genre, program, channel, or a combination thereof.

14. The method of claim 9, wherein the audience selection profile is based on subscriber location.

15. The method of claim 14, wherein the subscriber location includes home, work away, or a combination thereof.

16. The method of claim 9, wherein the audience selection profile does not include an identifier for the subscriber, the trusted identifier, a subscriber name, or any data that can be used to identify the subscriber.

17. A non-transitory machine-readable storage medium, comprising executable instructions that, when executed by a processor, facilitate performance of operations, comprising:

decoding signals received from a mobile device to obtain one or more packets, wherein the one or more packets comprise an HTTP POST message from the mobile device, wherein the HTTP POST message comprises an advertising identifier that is unique to the mobile device, wherein the advertising identifier is provided by a supplier of the mobile device and provides anonymity of a subscriber associated with the mobile device, wherein the HTTP POST message is generated from a pixel script embedded in an advertisement, wherein the pixel script is hidden behind a pixel of the advertisement, and wherein the pixel script is executed by the mobile device;

extracting a uniform resource locator (URL) of the HTTP POST message from a payload of the HTTP POST message;

determining whether the URL of the HTTP POST message is on a list of URLs used for accessing data management platforms;

responsive to a determination that the URL of the HTTP POST message is not on the list of URLs used for accessing the data management platforms, routing the HTTP POST message to an Internet; and responsive to a determination that the URL of the HTTP POST message is on the list of URLs used for accessing the data management platforms:

encrypting a trusted identifier, resulting in an encrypted trusted identifier that is cross-referenced to the advertising identifier, wherein subscriber data relating to the subscriber associated with the mobile device is keyed on the encrypted trusted identifier;

inserting the encrypted trusted identifier into the HTTP POST message, resulting in a modified HTTP POST message; and routing the modified HTTP POST message to the Internet, wherein the encrypted trusted identifier is to be associated, by a particular data management platform corresponding to the URL, in a database record with the advertising identifier, wherein associating of the encrypted trusted identifier with the advertising identifier in the database record permits the particular data management platform to transmit the advertising identifier to a third-party requestor based on matching the advertising identifier to audience selection criteria submitted by the third-party requestor to the particular data management platform, wherein receipt of the advertising identifier by the third-party requestor from the particular data management platform enables the third-party requestor to provide targeted advertisements to the mobile device using the advertising identifier, and wherein the routing the HTTP POST message to the Internet, responsive to the determination that the URL of the HTTP POST message is not on the list of URLs used for accessing the data management platforms, includes routing the HTTP POST message without inserting the encrypted trusted identifier into the HTTP POST message.

18. The non-transitory machine-readable storage medium of claim 17, wherein the operations further comprise receiving provisioning of demographic information relating to the subscriber, a user instruction to opt-in or opt-out of targeted advertising, or a combination thereof.

19. The non-transitory machine-readable storage medium of claim 17, wherein the database record comprises a bridge file.

20. The non-transitory machine-readable storage medium of claim 17, wherein the HTTP POST message further comprises advertising impression data.

* * * * *